March 9, 1937. C. D. MEYER 2,073,164
OIL ENGINE
Filed Aug. 21, 1929 5 Sheets-Sheet 3
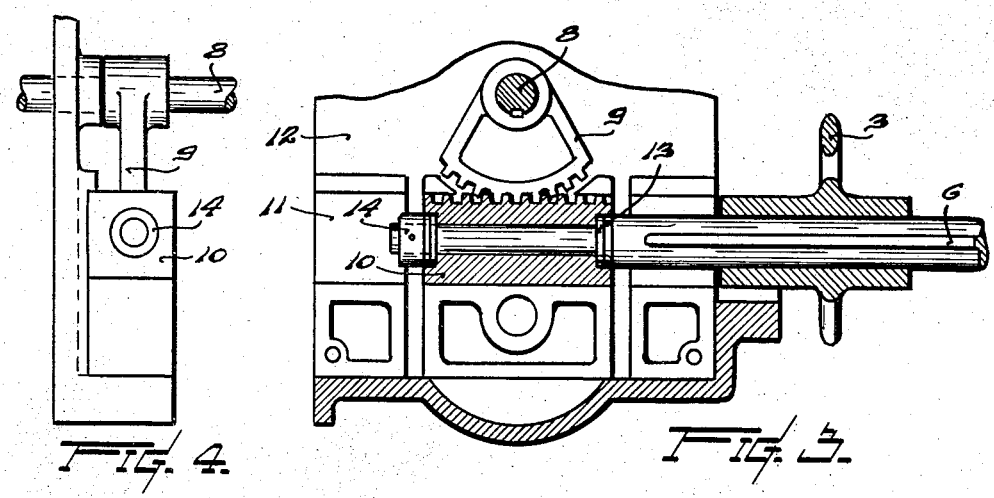
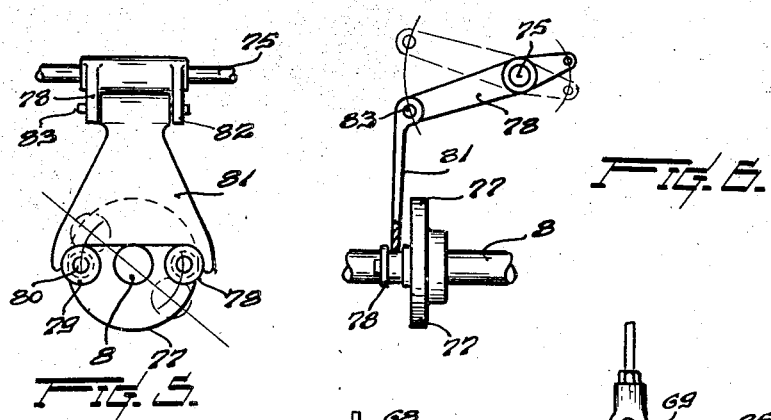
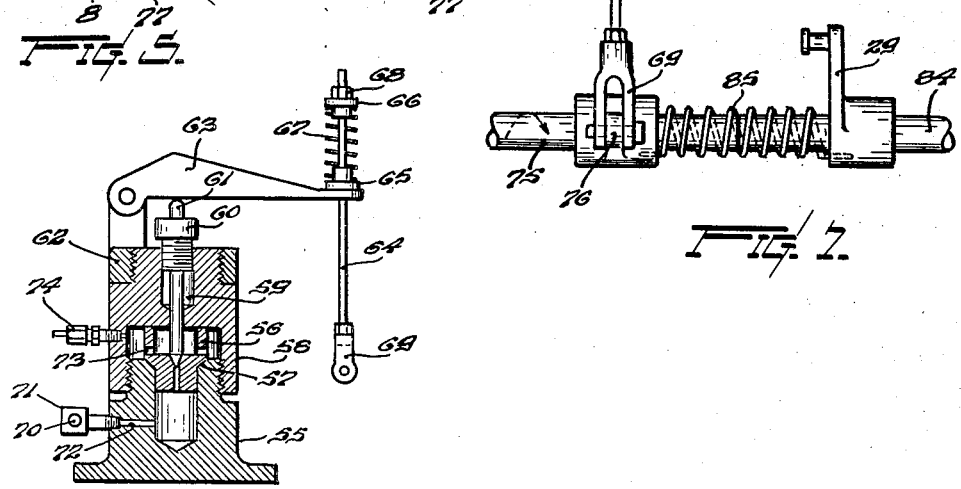
INVENTOR
BY C. D. Meyer
Edward E. Barnes
ATTORNEY March 9, 1937.  C. D. MEYER  2,073,164
OIL ENGINE
Filed Aug. 21, 1929  5 Sheets-Sheet 4

INVENTOR
BY C. D. Meyer.
Edward E. [Palmer]
ATTORNEY

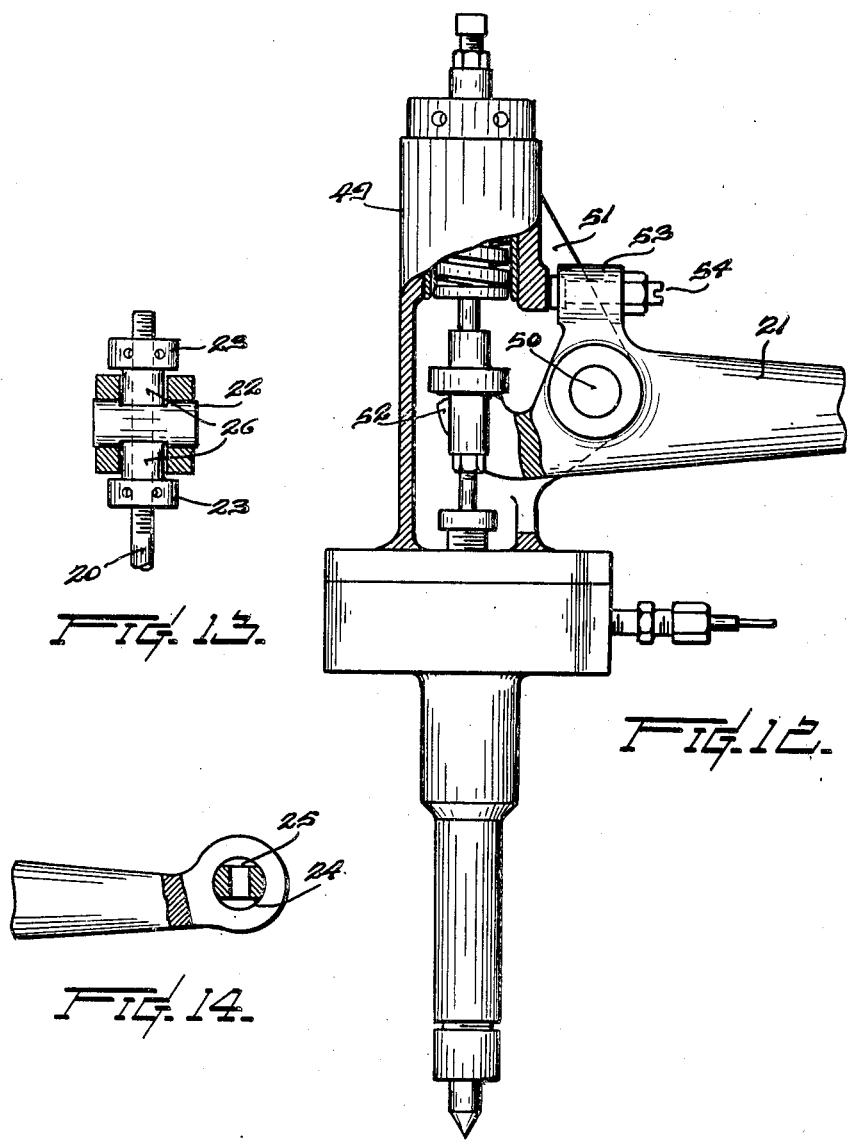

Patented Mar. 9, 1937

2,073,164

UNITED STATES PATENT OFFICE 2,073,164

OIL ENGINE

Charles D. Meyer, Seattle, Wash.

Application August 21, 1929, Serial No. 387,543

5 Claims. (Cl. 123—32)

This invention relates to the so-called airless injection oil engines; of the pressure fuel type having fuel valves hand controlled and mechanically operated; and its object, generally, is in the controlling and the timing of the fuel injection to secure an ignition and combustion at constant pressure (the Diesel cycle), and not at constant volume (the Otto cycle), as most of the commonly termed solid or airless injection engines are made today.

In this engine, combustion takes place with practically no rise in pressure from the maximum compression. On the contrary, indicator's cards show a slight drop in pressure from the maximum compression pressure. While the solid injection engine is not supposed to have a maximum explosive pressure beyond 500 to 550 pounds it is by no means uncommon to find the pressure rising as high as 750 pounds. If the engine is built to withstand this high pressure, no harm is done. However, such heavy construction means excessive manufacturing cost. Consequently in these engines the compression pressure is kept as low as possible or just high enough to secure ignition at 300 to 350 pounds. In doing so, the fuel consumption is increased and operation at low speed is difficult due to the low compression, with resultant non-ignition of the fuel.

In my improved fuel oil engine, I do not use compressed air for injection; but have evolved a mechanical principle whereby the timing of the fuel admission valve opening remains constant for all loads and speeds, as in a true Diesel, and the time of its closure or cut off is controlled by means of a single throttle lever. I use in my improved fuel oil engine, plunger pumps to maintain fuel pressure into the fuel line and fuel admission valves. The fuel pressure is controlled by a pressure regulator. There is also a governor to regulate the engine speed acting on the fuel admission valve pull rods in such a manner that the height of the fuel valve lift is proportional to the amount of fuel needed for the speed at which the governor is set. The governor is made to work against a resistance spring which is under control of the operator through the means of the single throttle lever.

I also retain the principle of high compression, 500 pounds or more per square inch, for the following reasons: first, better fuel economy, and second, it shortens the period of combustion inasmuch as the time lag of fuel ignition decreases as the compression increases. It is possible to time these engines late, thereby improving their running efficiency, allowing them to be run at extremely low speed without shock or jar.

The engine is preferably made of the four cycle principle, although it is also adaptable for two-cycle operation. The novel system involved is admirably adapted for marine engines, as engines of very small power as well as of large capacity can be made.

The manual control of these engines is as simple as those found on steam engines of similar power, namely a single lever or throttle. In my improved engine, the general design of the crank case, engine frame, cylinder jacket, cylinder liners, cylinder heads, crank shaft and bearing, pistons and connecting rods follow the general practice found in engines of this type.

The invention is illustrated in the accompanying drawings, in which—

Figure 3 is a side view of the end of the fuel cam shaft showing the toothed thrust-block and quadrant to operate the fuel cam shaft;

Figure 4 is an end view of Figure 3;

Figure 5 is an illustrative view of the two-way tension mechanism keyed to the throttle shaft;

Figure 6 is a side view of Figure 5;

Figure 7 is a side view of the end of the jack shaft, meeting the end of the valve-control shaft, with the tension spring between them;

Figure 8 is a sectional view of the fuel relief valve or pressure regulator;

Figure 12 is a view of the fuel admission valve used on my engine showing the construction of the rocker arm;

Figure 13 is a sectional side view of the end of the rocker arm showing the hinge pin; and Figure 14 is a sectional end view of the end of the rocker arm showing the hinge pin and adjusting nuts of the pull rod.

Two cam shafts are used in the engine, each having a set of special cams. For simplicity, the cam shaft which operates the inlet and exhaust valves will be referred to as the valve cam shaft, being located at one side of said engine, see 1, Figure 2. The other shaft operating the fuel admission valves, hereinafter termed the fuel cam shaft, is located at the other side of said engine, see 2, Figure 2.

Figure 1:
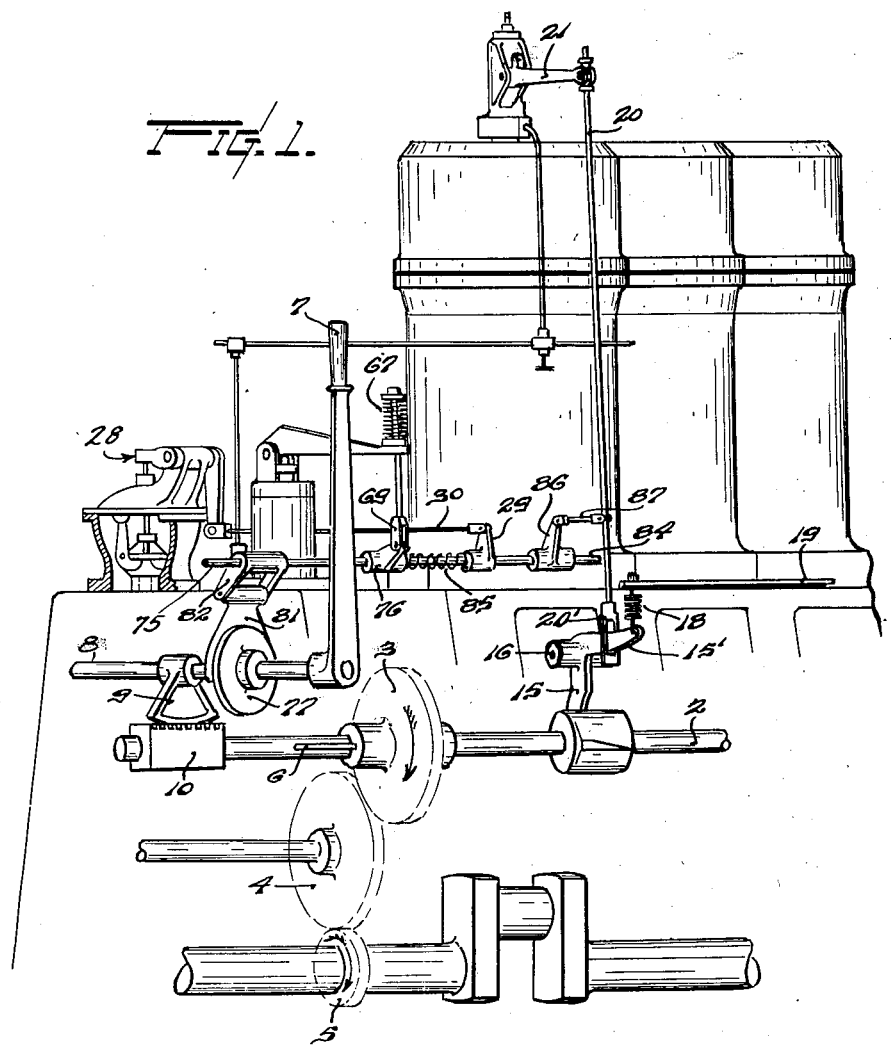
Figure 1 is an assembly view of a multiple cylinder, four cycle engine to which my improved devices are applied.

The fuel cam shaft 2 is driven from the crank shaft by a train of gears, 3, 4 and 5, Figure 1, and is free to move axially in bearings and through the hub of the drive gears 3, which latter rotate the fuel cam shaft 2 by means of feather keys 6. Figures 1 and 3. The axial or longitudinal movement of the fuel cam shafts is accomplished through the means of a lever or throttle 7 keyed to the throttle shaft 8 and to the tooth quadrant 9, Figures 1 and 3, the tooth of the quadrant engaging the teeth of the thrust block 10 which is free to slide into the ways 11 machined in the housing 12, Figure 3. Thrust block 10 is bored and counter-bored to receive the end of the fuel cam shaft 2, thrust washer 13 and nut 14.

Figure 2:
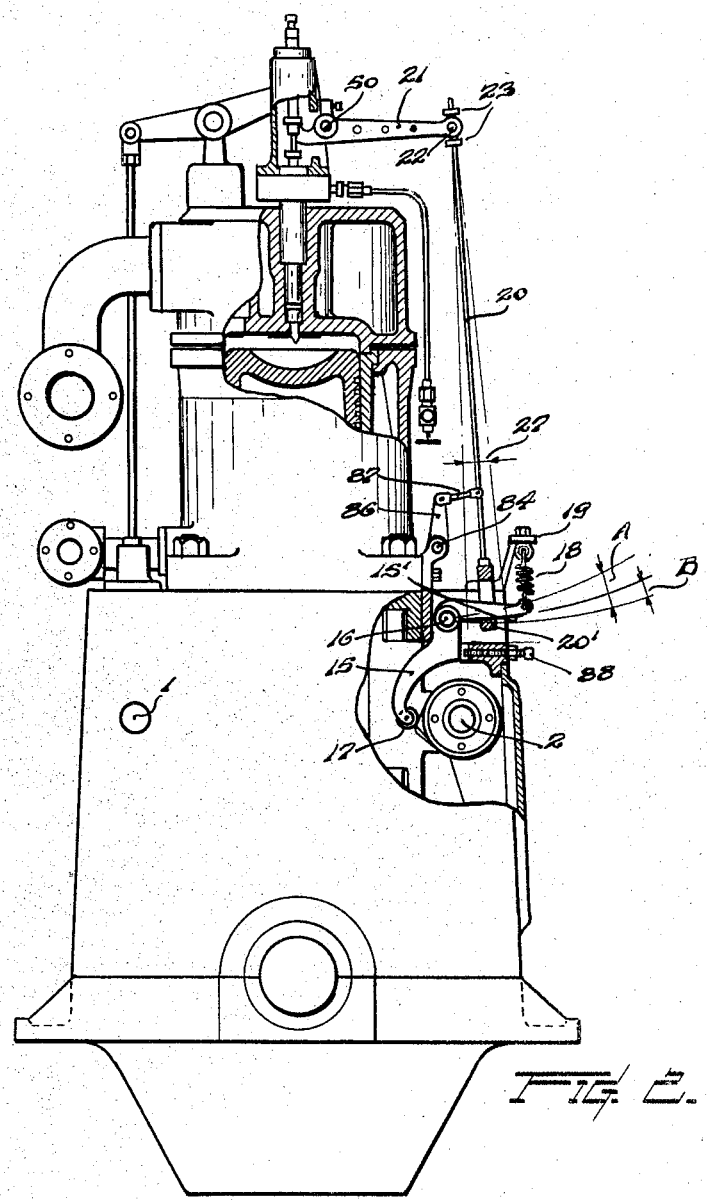
Figure 2 is a sectional view through one of the cylinders, parts being shown in side elevation.

The fuel cam, illustrated in Figures 1 and 2, operates the bell crank lever 15, which is fulcrumed to the engine frame on the pin 16 and carries at its lower extremity the cam roller 17 which is held in contact with the cam by the spring 18 fastened to the guard rail 19 and to the free end of said bell crank. The purpose of this bell crank is to convert the push movement imparted thereto by the cam into a pulling motion upon a pull rod for the fuel valve. As the fuel cam revolves an intermittent motion is communicated to the lever 15 as the roller 17 follows the contour of the cam. A part of this intermittent motion indicated by B is imparted to the pull rod 20 which has at its lower end a stirrup 20¹ into which the lower side 15¹ of the bell crank's free end comes in contact at each revolution of the cam.

The side 15¹, called the contacting side, of the bell crank lever is machined on a radius equal to the length of the pull 20, an adjusting screw 88 serving to regulate the clearance between the roller 17 and the cam.

The pull rod 20 is connected to the fuel admission valve rocker arm 21 by means of a pin 22 and two adjusting nuts 23. The pin 22 has at its midlength two flat sides 24, Figures 13 and 14, and a hole 25 to receive the pull rod 20. On said flat sides 24, rest the ends of the adjusting nuts 23, the pin 22 fitting into the eyes of the forked end of the rocker arm 21. The adjusting nuts 23 have a neck-extension 26 extending between the forked end of the rocker arm to prevent any side play to the pin.

The pull rod 20 is free to oscillate from the end of the rocker arm 21 through an angle 27, and is connected to the governor thrust collar 28 by means of the lever 86, link 87, lever 29 and link 30.

The system above referred to transmits motion from said cam to the valve by employing members under tension as distinguished from the customary compression linkage. Such is extremely important inasmuch as the part referred to, being the pull rod 20, can be formed extremely light with an appreciably quicker reaction to impulses from the bell crank. As formerly constructed with the connecting parts working under compression and accordingly formed relatively heavy to obviate buckling, it has been found that due to the inertia the parts are unable to follow the exact contour of the cam except at low speeds. More especially, as the contacting roller leaves the peak of the cam it jumps beyond the intended cut-off point and causes the fuel valve to remain open longer than the engine design intends. After continued use, a groove is worn on the body proper of the cam where the roller contacts the same, the development of which causes the roller to rebound with a second fuel injection occurring. In the present instance, the very light connecting parts allowed develop less inertia with the contacting parts (bell crank 15¹ and stirrup 20¹) being forced out of contact at the instant the fuel valve is closed. Very high speed can be attained. The disconnecting feature represented by A in Fig. 2 allows the pull rod 20 to freely oscillate on the bell crank arm without friction, the pull rod following the action of the governor within its most minute movements.

The fuel cam illustrated in Figures 1, 2, 9, 10 and 11 is one of the main features of my invention, its design permitting the timing of the fuel admission valve to remain constant, that is to begin to open at a relatively invariable period of the engine cycle, and affording a controlled cut off of the injection at any point desired, through the means of a single lever or throttle without, however, altering the timed setting of admission.

Another important feature of this fuel cam is that it provides a variable period of fuel admission without affecting the height of lift of the fuel valve, the feature permitting the valve lift to be adjusted minutely with the adjustment remaining constant at all speeds. The amount of lift has an important bearing on the life of the fuel valve, which is held in its closed position by means of a strong spring exerting a pressure of 400# or more. Such valve, being a needle valve of small diameter, where operation by a cam of various lift will naturally work at its maximum lift when under power, the spring pressure being proportionately increased with the height of lift. A maximum wear results upon each of the related parts to require frequent adjustments. Such wear, as respects the needle valve, not infrequently breaks the same and due to the pounding received from a high lift wears the seat out of shape to cause leakage. Having reference to the roof-shaped cam which has been generally used on pressure fuel systems, the peak of the cam nose must be maintained reasonably sharp in order to secure a limited fuel valve opening for idling. However, due to the fact that this peak is used at all engine loads, it not only raises the fuel valve more than necessary but due to excessive pressure causes the peak to wear out prematurely. It accordingly becomes impossible to idle the engine. Respecting the present cam, the part which is used for idling is not in operation when the engine is under load. The needle is not elevated at its full load more than at idling with consequent assurance of longer life and smoother operation.

This system of the fuel injection is a considerable improvement over that used in the true Diesel (air injection) engines, as it accomplishes the same result with an elimination of complicated and expensive multiple stage air compression means necessary to the latter.

The engine utilizes two systems of fuel-valve control, the cam system which controls the period of admission and the pull rod and bell crank or link system which controls the amount of lift by means of the governor. The latter system balances the former which is to say that if the period of fuel injection is too great for a given load the governor acts on the pull rod to decrease the valve lift while if the period is too short a greater lift results. It is believed clear that while either system could be used individually to advantage in certain cases, the combination of the two working in conjunction is preferable.

Figure 9:
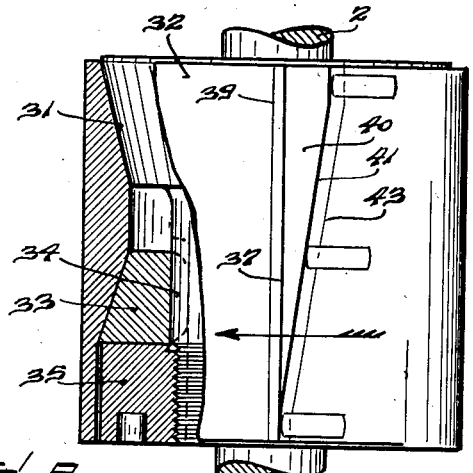
Figure 9 is a plan view of the fuel cam showing the angular shape of the cam hose.

The design of my improved fuel cam consists of an annular steel ring having an internal and external diameter, also a length to suit the size of the engine, the interior of said ring being bored to form two cone surfaces 31 pointing toward each other, see Figure 9. Said ring is adapted to rest upon a hub 32, which is keyed to the fuel valve shaft 2, said hub having one end machined conically and the other part substantially cylindrical, over which latter portion slides the cone clutch ring 33 which is prevented from rotating about said hub 32 by the feather key 34. The other end of the hub 32 is threaded to receive the clamping nut 35 which has the recess 35¹, into which a special wrench is adapted to take in loosening or tightening the same when setting the cam in relation with said shaft.

The object of providing a cam adjustable angularly within unrestricted limits on the cam shaft is to facilitate assembling or adjustment of the cam on its shaft, rendering it unnecessary to replace the shaft to any particular position by reason of an accommodation to a timing of the cam to any position on the shaft. A further advantage, of especial import after the system has been in use for some period of time to cause the gear tooth or teeth in line with the cam nose to be worn as a result of the shock imparted thereto as the cam nose is engaged, is that the cam may readily be secured in a new position with its nose rotated out of alignment with the worn tooth.

The outside surface of the steel ring or cam is cylindrical except for a small part which has a radial projection extending the full length of the ring, this projection being machined to form the fuel cam nose 36. The forward side, that is the side of the cam which comes first in contact with roller 17, is called the leading edge (see arrow in Figure 9 for direction of rotation). This leading edge 37 is parallel to the axis of the shaft 2 and is at a certain radial distance from the outside circular surface of said ring. Tangential to the said outside circular surface and extending to the said leading edge is the plane 38 extending the whole length of the said steel ring. This plane surface is parallel to the axis of the shaft, and on or near the leading edge is located the admission line 39. That is to say that if the fuel cam is rotated in the direction indicated by the arrow, the roller 17 will rise upon the plane 38 until it has reached a position where a further rise will cause the fuel admission valve needle to begin to open. This position is represented by the line 39 and the difference in radial distance between the admission line 39 and the leading edge 37 measured from the center of the shaft 2 is the height the roller 17 will rise to open the fuel admission valve.

Figure 10:
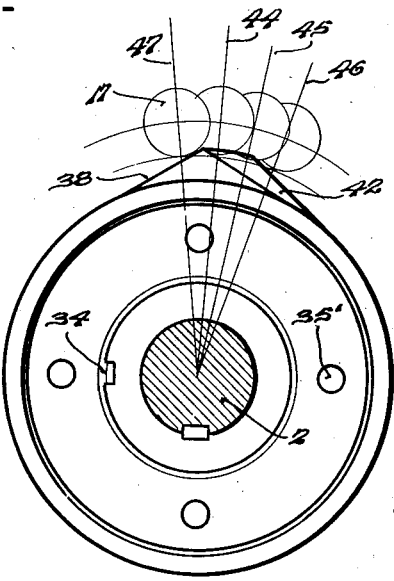
Figure 10 is an end view of Figure 9, showing the on-leading side, the admission line, and the following side cut-off line of said cam.

Back of the leading edge 37 is the plane 40 which is a turned surface parallel to the axis of the shaft. It is triangular in shape and forms a second edge called the following edge 41. Between this following edge 41 and the curved surface of the ring body and tangential to the latter is the twisted plane surface 42. On this said surface and near the following edge 41 is the cut off line 43. That is to say that if the fuel cam has caused the roller 17 to reach the admission line 39, and is further rotated, the roller will cause the fuel admission valve to open and keep it open when the angular surface 40 passes under the roller, beginning to close when the following edge 41 passes under the center of the roller and finally closing when the cut off line 43 is directly under the center of the roller. This fuel cam is moved axially under the roller 17 by means of the throttle lever 7. Reverting back, the roller being in fixed position relative to the shaft axial movement, it is easily apparent that when the fuel cam end which has the vertex of the angle surface 40 is under the roller 17, the fuel valve opening will be short as at (44). When the fuel cam is in middle position the cut off will occur later (45), and when the fuel cam end which has the base of the angle surface 40, is under the roller, the fuel valve opening will be longest, as the cut off will occur still later (46). In Figures 9 and 10, the roller position is shown when the fuel valve begins to open (47); and in the three positions of the cut off mentioned above, 44, 45, and 46.

Figure 11:
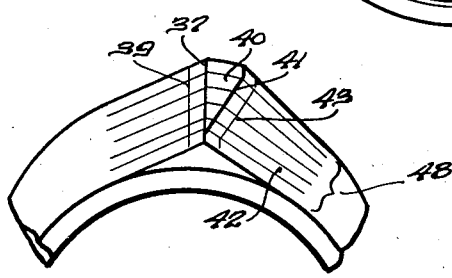
Figure 11 is an inclined view of Figure 10 showing the admission line and cut-off line, the several paths indicated by lines illustrating the roller travel of said cam for different throttle openings.

In Figure 11, the lines included within the bracket 48 represent a number of paths followed by the roller 17, also the leading edge 37, the following edge 41, the line of admission 39, the cut off line 43, the wedge surface 40 and the twist surface 42.

In the fuel admission valve, Figure 12, used in my engine, the housing 49 carries the rocker arm pin 50 which is secured to the ribs 51 by tapered pins (not shown). The rocker arm 21 has the two finger lifts 52, one of which is shown broken away, and the stop lug 53 containing the adjusting screw 54 with its associated lock nut. This stop lug 53 is to prevent the rocker arm 21 from rebounding at the instant of the valve closure.

In Figure 8 is a sectional view of the relief valve or fuel oil pressure regulator used in my engine. It consists of a body 55 having a flanged base. the body 55 is bored to receive the cup-shaped valve seat 56 fitted thereto by a ground joint 57, the latter being secured on the base 55 by the valve cap 58 which is screwed on to the base 55, pressing on the top edge of the cup 56 to hold it securely in place.

The valve cap has the stuffing box 59 and the stuffing box gland 60, through which passes the valve rod 61 to the valve seat in the cup 56. To the valve cap 58 is screwed the lever yoke 62, to which is fulcrumed the valve lever 63 utilized to hold the valve rod 61 on its seat. The free end of this lever is formed into an eye, into which passes the rod 64, having at its upper end two guide washers 65—66 and therebetween, the spring 67. The rod end is threaded and is elongatedly adjusted by the nut 68. The lower end of rod 64 is fitted with a clevis 69.

Fuel oil from a force pump not shown is led to the oil pressure regulator by the pipe 70 Figure 8, through the medium of the fitting 71. From the fitting 71 the fuel oil enters the regulator through the passage 72, fills the lower chamber space below the valve, and as the pressure increases this valve is raised and the oil enters the cup 56 and escapes through the holes 73 into the space surrounding the cup to flow back to the oil tank through the oil return line 74.

The pressure desired is obtained by varying the pull on the clevis 69 which is indicated as connected to the jack shaft 75 by means of the lever 76 keyed to shaft 75. This shaft is given a partial rotation by the throttle shaft 8 when the throttle 7, Figure 7, is moved to axially operate the fuel cam shaft 2. This motion of the throttle 7 is communicated to the disk 77, Figures 5, 6, 9, which is keyed to the throttle shaft 8. On diametrically opposite sides of the disk are two rollers 78—79, loosely fitted on the pins 80 riveted to the disk 77. Resting vertically on these rollers 78, 79 is the hinged plate 81 connected on its upper end to the double lever 82 by the pin 83. The double lever 82 is keyed to the jack shaft 75.

The jack shaft 75 is axially in line with the valve-control shaft 84 and is connected to the latter by the torsion spring 85. On the valve-control shaft is the lever 29, to which is connected the governor link 30, Figure 1. The valve-control shaft carries the levers 86 which are connected to the pull rod 20 by means of the link 87 and adapted to control the oscillations through an angle 27, Figure 2, under the influence of the governor, said governor being resisted by the spring 85 which is controlled by the throttle 7.

Referring to Figure 1 the system used on non-reversing engines, assuming that said system is fitted to an engine and that it is wished to time said system so that the fuel admission valve begins to open at top dead center, the engine is barred over until the piston is at top compression stroke, the clamp nut 35 is loosened and the fuel cam is rotated on its hub until the admission line 39, see Figures 9, 10, is directly under the bell crank roller 17 and then the clamp nut 35 is screwed on tight. The pull rod 20 is then adjusted for length by means of the adjusting nuts 23 in such a manner that the stirrup 21 is in contact with the contacting side 22 of the ball crank arm. The engine then is said to be timed, that is, the instant at which the fuel admission valve will begin to open is governed by the setting of said fuel cam with reference to a point on the periodic cycle of the engine in this case (top dead center) on the compression stroke, the admission line 39, see Figures 9 and 10, being parallel to the axis of the cam shaft the timing will remain constant while the fuel cam shaft is rotated or axially moved by means of the throttle lever 7. The fuel injection, however, is variable as the cut off line 43 is at an angle to said fuel cam axis, and thereby the period of fuel injection cut off is selectively set by a manual movement of the throttle lever 7 while the engine is running or stopped.

There is also in Figure 1 a ball governor having its thrust collar 28 connected to the pull rod 20 by means of the lever 29 and the link 30. The action of this governor is to constantly compel the pull rod stirrup 21 to engage the bell crank arm 22 near the fulcrum pin 16, thereby decreasing the fuel valve lift. This action is opposed by the spring 85 which is interconnected to the throttle 7 in such a manner that when said throttle 7 is moved to increase the period of fuel injection by axially moving said fuel cam shaft the governor spring is compressed to offset the governor increase action and to maintain the increase speed of said engine due to the longer period of fuel injection. But if too much fuel is admitted for light load, or no load, the engine speed will cause the governor to overcome the tension of the spring 85 and cause the stirrup 21 to be engaged by the bell crank arm 22 near its fulcrum, thereby decreasing the fuel admission valve lift to maintain its speed; or if more load is applied to the engine, for the fuel admitted the engine speed will decrease and the spring 85 will overcome the action of said governor and cause the stirrup 21 to be engaged by the bell crank arm 22 more toward its free end, thereby increasing the fuel admission valve lift to maintain the engine speed required and set by the throttle lever 7. The governor acting on the pull rod 20 completely controls the fuel admission valve lift or fuel injection for any throttle opening without effecting the timing or cut off of said fuel system of injection.

What I claim, is:—

1. A valve gear for an internal combustion engine of the Diesel type comprising the combination of a fuel injection valve connected to a source of fuel supply under pressure, means actuated by the engine for operating the fuel valve to open the valve at a constant point located at or near the engine top dead center and close the valve at variable points in the engine power stroke for altering the duration of the fuel injection period selectively, said fuel valve being regulated by hand to vary the point at which the same closes, an engine-driven governor, a movable valve member for said fuel valve, a governor-controlled means having connection with said movable valve member to regulate the lift of said fuel valve, said valve member being intermittently engaged by the engine-actuated means to operate said fuel valve, an adjustable spring for said governor, and means for simultaneously controlling the sensitiveness of said spring and the means for regulating the variable cut-off of fuel injection.

2. In an internal combustion engine having a source of fuel supply under pressure, a fuel-injection valve receiving fuel from said source of supply, means regulated by hand for controlling said valve to obtain variable periods of fuel injection, a governor, means controlled by the governor for regulating the lift of the fuel valve and operating to vary the volume of fuel injection in inverse proportion to the duration of the fuel injection period, a spring opposing the action of the governor, and means interconnecting said spring with the hand regulation for the valve-control means to simultaneously regulate the sensitiveness of the spring and the means affording variation in the period of fuel injection.

3. In a fuel injection system for an internal combustion engine, a source of fuel supply under pressure, a fuel injection valve receiving fuel from said source of fuel supply, means for periodically opening said fuel injection valve at an invariable point of the engine cycle and maintaining the same in open position for selectively variable crank-angle durations of fuel injection with respect to the engine cycle, an engine-driven governor, governor-controlled means to regulate the lift of said fuel injection valve, an adjustable spring resisting the action of the governor, means for adjusting said spring for varying the sensitiveness of said governor, means for varying the crank-angle duration of fuel valve opening, and means for simultaneously regulating the means for adjusting said spring and the means for varying the crank-angle duration of fuel injection.

4. In combination, a source of fuel supply, a fuel injection valve to an engine, means to deliver fuel under pressure from said source of supply to the injection valve, engine-driven manually-controlled means acting to open said fuel injection valve at a predetermined fixed point of the engine cycle and to close said valve at selectively variable points of the engine power stroke, an engine-driven governor, governor-controlled means for varying the lift of the fuel valve, a governor spring, and a manually-controlled mechanism interconnected with the governor spring and with the means controlling the variable closing points of said fuel valve to simultaneously regulate said spring to regulate the sensitiveness of said governor and the closing point of the fuel injection valve.

5. In an internal combustion engine, in combination, a source of fuel supply, a fuel injection valve, means to deliver fuel under pressure from said source of supply to the fuel injection valve, adjustable engine-driven means operating to open said valve at a constant point with respect to the engine cycle with the adjustment thereof acting to vary the point of closing with respect to the engine cycle, an engine-driven governor, an adjustable spring for the governor, a governor-controlled means for varying the lift of the fuel injection valve, a by-pass line leading from said source of fuel supply, a by-pass valve in said by-pass line provided with mechanism whereby the valve may be adjusted, the setting of said adjusting mechanism for the by-pass valve acting to determine the fuel pressure in the source of fuel supply, means for adjusting the spring for the governor, and means acting to simultaneously regulate the by-pass valve, the means for adjusting the spring, and the means for varying the point of closure of the fuel injection valve.

CHARLES D. MEYER.